US011551230B2

(12) United States Patent
Huang et al.

(10) Patent No.: US 11,551,230 B2
(45) Date of Patent: Jan. 10, 2023

(54) SECURITY ATTACK DETECTIONS FOR TRANSACTIONS IN ELECTRONIC PAYMENT PROCESSING NETWORKS

(71) Applicant: Visa International Service Association, San Francisco, CA (US)

(72) Inventors: Jianhua Huang, Cedar Park, TX (US); Chiranjeet Chetia, Round Rock, TX (US)

(73) Assignee: VISA INTERNATIONAL SERVICE ASSOCIATION, San Francisco, CA (US)

(*) Notice: Subject to any disclaimer, the term of this patent is extended or adjusted under 35 U.S.C. 154(b) by 58 days.

(21) Appl. No.: 17/148,237

(22) Filed: Jan. 13, 2021

(65) Prior Publication Data

US 2021/0217019 A1 Jul. 15, 2021

Related U.S. Application Data

(60) Provisional application No. 62/960,889, filed on Jan. 14, 2020.

(51) Int. Cl.
*G06Q 20/40* (2012.01)
*G06Q 20/02* (2012.01)
*H04L 9/40* (2022.01)

(52) U.S. Cl.
CPC ....... *G06Q 20/4016* (2013.01); *G06Q 20/027* (2013.01); *G06Q 20/407* (2013.01); *H04L 63/1425* (2013.01)

(58) Field of Classification Search
CPC ............. G06Q 20/4016; G06Q 20/027; G06Q 20/407; H04L 63/1425

USPC .......................................................... 705/44
See application file for complete search history.

(56) References Cited

U.S. PATENT DOCUMENTS

| 7,234,168 | B2* | 6/2007 | Gupta | ................. | H04L 63/1416 |
| | | | | | 713/192 |
| 7,664,845 | B2* | 2/2010 | Kurtz | ..................... | G02B 6/105 |
| | | | | | 709/224 |
| 10,581,886 | B1* | 3/2020 | Sharifi Mehr | ...... | H04L 63/1441 |
| 10,868,825 | B1* | 12/2020 | Dominessy | ......... | H04L 63/1433 |
| 10,936,658 | B2* | 3/2021 | Wu | ..................... | G06F 16/9024 |
| 2003/0004689 | A1* | 1/2003 | Gupta | ................. | H04L 63/1408 |
| | | | | | 702/188 |
| 2003/0158751 | A1* | 8/2003 | Suresh | ................... | G06Q 40/02 |
| | | | | | 702/179 |

(Continued)

FOREIGN PATENT DOCUMENTS

| CN | 105095238 | A | * | 11/2015 | | |
| CN | 109409948 | A | * | 3/2019 | ............. | G06Q 10/20 |

(Continued)

OTHER PUBLICATIONS

"Identifying Illicit Accounts in Large Scale E-payment Networks—A Graph Representation Learning Approach," by Da Sun Handason Tam; Wing Cheong Lau; Bin Hu; Qiu Fang Ying; Dah Ming Chiu; and Hong Liu. Published: Jun. 13, 2019 (Year: 2019).*

*Primary Examiner* — Sara C Hamilton
(74) *Attorney, Agent, or Firm* — Schwabe, Williamson & Wyatt, PC

(57) ABSTRACT

Systems, apparatuses, methods, and computer-readable media are provided for detecting security attacks based on transaction flow graphs. Other embodiments may be described and/or claimed.

15 Claims, 8 Drawing Sheets

(56) References Cited

U.S. PATENT DOCUMENTS

| | | | | |
|---|---|---|---|---|
| 2003/0187759 A1* | 10/2003 | Arthus | ............. | G06Q 20/40 |
| | | | | 705/30 |
| 2003/0187783 A1* | 10/2003 | Arthus | ............. | G06Q 20/10 |
| | | | | 705/39 |
| 2006/0059110 A1* | 3/2006 | Madhok | ............. | G06Q 20/425 |
| | | | | 705/75 |
| 2007/0294187 A1* | 12/2007 | Scherrer | ............. | G06Q 20/401 |
| | | | | 705/75 |
| 2013/0275247 A1* | 10/2013 | Ramaratnam | ............. | G06Q 20/20 |
| | | | | 705/16 |
| 2016/0086185 A1* | 3/2016 | Adjaoute | ............. | G06Q 20/4016 |
| | | | | 705/44 |
| 2017/0288990 A1* | 10/2017 | Atasu | ............. | G06F 17/30961 |
| 2018/0069885 A1* | 3/2018 | Patterson | ............. | G06F 21/554 |
| 2018/0330190 A1* | 11/2018 | Ouzounis | ............. | G06T 7/12 |
| 2018/0351817 A1* | 12/2018 | Aggarwal | ............. | G06F 21/552 |
| 2019/0073647 A1* | 3/2019 | Zoldi | ............. | G06Q 20/383 |
| 2019/0121979 A1* | 4/2019 | Chari | ............. | G06N 20/00 |
| 2020/0349284 A1* | 11/2020 | Saket | ............. | G06F 21/64 |
| 2020/0394659 A1* | 12/2020 | Qu | ............. | G06Q 20/4016 |
| 2021/0182285 A1* | 6/2021 | Haprian | ............. | G06F 16/284 |
| 2021/0182315 A1* | 6/2021 | Haprian | ............. | G06F 16/242 |
| 2021/0182316 A1* | 6/2021 | Haprian | ............. | G06F 16/242 |

FOREIGN PATENT DOCUMENTS

| | | | | |
|---|---|---|---|---|
| CN | 110751354 A | * | 2/2020 | ......... G06Q 10/0635 |
| WO | WO-2004061733 A1 | * | 7/2004 | ............. G06Q 20/04 |

* cited by examiner

SECURITY ATTACK DETECTIONS FOR TRANSACTIONS IN ELECTRONIC PAYMENT PROCESSING NETWORKS

CROSS-REFERENCE TO RELATED APPLICATION

This application claims the benefit of provisional Patent Application Ser. No. 62/960,889 filed Jan. 14, 2020, and entitled "SECURITY ATTACK DETECTIONS FOR TRANSACTIONS IN ELECTRONIC PAYMENT PROCESSING NETWORK," the contents of which are incorporated herein by reference in their entirety.

BACKGROUND

An electronic payment processing network may facilitate transactions among consumers, merchants, processors, banks, independent sales organizations (ISOs), or other payment processing parties. Every year, billions of electronic payment transactions and trillions of dollars are processed through the electronic payment processing networks. A large amount of data are generated by those transactions through the electronic payment processing networks. Data flows regularly into a data warehouse for the electronic payment processing network from transactional systems, relational databases, and other sources. Supervised and unsupervised models are usually used to detect abnormal transactions in an electronic payment processing network. However, these traditional methods may fail to detect some complex security attacks. Embodiments of the present disclosure address these and other issues.

DETAILED DESCRIPTION

Supervised and unsupervised models are usually used to detect abnormal transactions in an electronic payment processing network. However, in these traditional methods, the individual transactions are often treated separately. If fraudsters use different accounts to withdraw money slowly, it may be difficult for many traditional models to detect the abnormal behavior, because those accounts are not connected. Hence, it is difficult to detect the collaborative frauds when individual transactions are treated separately in a model. An electronic payment processing network may also be referred to as an electronic payment transaction processing network.

In some embodiments, a system utilizes a graph framework to connect transactions hierarchically, so that abnormal transaction patterns can be identified at appropriate connection level automatically. Thus, the stakeholders can investigate into the affected nodes, to prevent further losses. Embodiments herein present mechanisms to identify multiple transactions with shared financial or location attributes and detect an abnormal activity in a higher level of a financial hierarchy or a location hierarchy by aggregating small fraud values together. The detection of an abnormal activity in a higher level is achieved by using a transaction flow graph including two trees coupled together at the leaf nodes. A first tree represents a financial hierarchy and a second tree represents a location hierarchy. The transaction flow graph can be updated in real time, without the need for pre-training a model. Embodiments herein may be very useful to detect collaborative frauds.

Some embodiments of the present disclosure may use a transaction flow graph to connect transactions together based on shared attributes, and detect abnormal transactions at different connection levels. What is more, a transaction flow graph can be updated in real time, without the need for pre-training a model.

As long as the transactions can be connected hierarchically, the transaction flow graph can aggregate the small fraud values into an abnormal signal in a higher level, which is very useful for detecting collaborative frauds (e.g., a cashout event).

Some embodiments disclosed herein may display the money flow between different levels of the transaction flow graph, and this flow can be used to identify the nodes with abnormal inflow/outflow transaction volumes.

Figure 1:
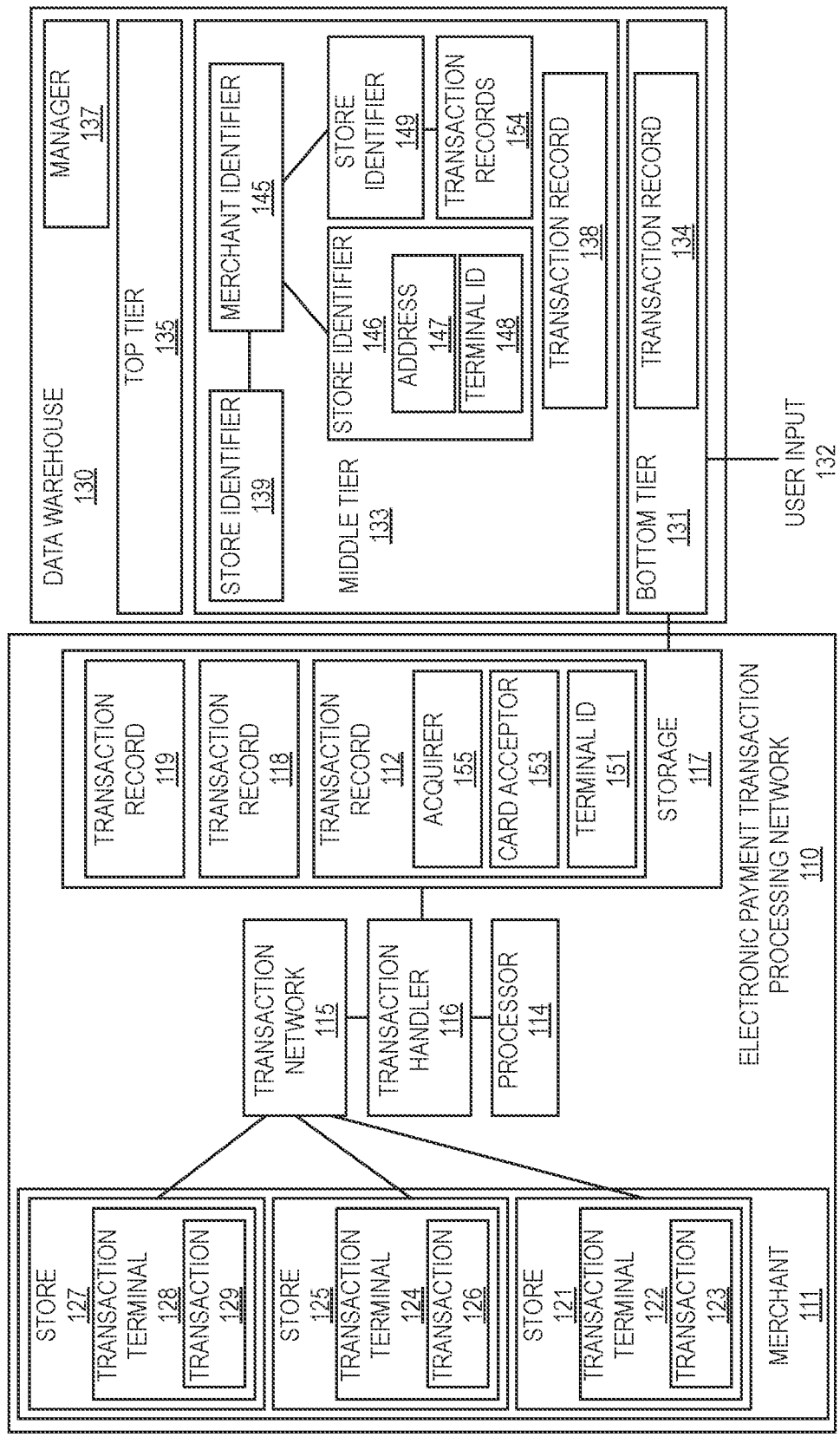
FIG. 1 illustrates an example of a system architecture to manage a data warehouse associated with an electronic payment processing network, in accordance with various embodiments.

FIG. 1 illustrates an example of a system architecture to manage a data warehouse 130 associated with an electronic payment processing network 110, in accordance with various embodiments.

In embodiments, the electronic payment transaction processing network 110 includes one or more merchants, e.g., a merchant 111, a transaction network 115, a transaction handler 116 to be operated on a processor 114, and a storage 117 that may be coupled to the processor 114. The merchant 111 may include multiple stores, e.g., a store 121 located in a first region, a store 125 located in a second region different from the first region, and a store 127. For example, the first region may be within a first city or country, and the second region may be within a second city or country. A store may include multiple transactional terminals that process some payment transactions. For example, the store 121 includes a transactional terminal 122, which may process a payment transaction 123. The store 125 includes a transactional terminal 124, which may process a payment transaction 126. The store 127 includes a transactional terminal 128, which may process a payment transaction 129. A payment transaction, e.g., the payment transaction 123, the payment transaction 126, or the payment transaction 129 may be a debit card transaction, a prepaid credit transaction, a credit transaction, a fund transfer transaction, a mobile payment transaction, an online transaction, or a commercial payment transaction.

In some embodiments, a transaction processed by a transactional terminal in a store may go through the transaction network 115 to request an authorization or approval by the transaction handler 116. The transaction network 115 may include any telecommunication network, wired or wireless network connecting a transactional terminal to the transaction handler 116 of a payment processing facility. When the transaction handler 116 approves a transaction, the transaction handler 116 also generates a transaction record to be stored in the storage 117. For example, the transactional terminal 122 may process the payment transaction 123, which may be approved by the transaction handler 116 through the transaction network 115, while the transaction handler 116 generates a transaction record 112 stored in the storage 117. Similarly, the transactional terminal 124 may process the payment transaction 126, which may be approved by the transaction handler 116 through the transaction network 115, while the transaction handler 116 generates a transaction record 118 stored in the storage 117. The transactional terminal 128 may process the payment transaction 129, which may be approved by the transaction handler 116 through the transaction network 115, while the transaction handler 116 generates a transaction record 119 stored in the storage 117. The transaction record 112, the transaction record 118, or the transaction record 119 may be a transaction record for a debit card transaction, a prepaid credit transaction, a credit transaction, a fund transfer transaction, a mobile payment transaction, an online transaction, or a commercial payment transaction. A transaction record may include a terminal identifier, or a card acceptor identifier. For example, the transaction record 112 may include a terminal identifier 151, a card acceptor identifier 153, and an acquirer identifier 155. Furthermore, a transaction record may include other information, e.g., the date and time of the transaction, the amount of the transaction, merchant address and/or merchant name, account information identifying the consumer account from which the payment is made, and more.

In some embodiments, the data warehouse 130 may refer to a set of components that work together to provide the overall data-warehousing capability to an organization. The data warehouse 130 is different from a generic database in some embodiments. A database is the generic term for a storage system to store data, which is used for many purposes, including, for example, transaction processing, supporting application functionality and enabling reporting. Databases include, for example, online transactional processing (OLTP) used in application databases, online analytical processing (OLAP) used in data warehouses, XML, comma-separated values (CSV) files, text files and spreadsheets. Most databases are constrained in use to a specific application, business process or purpose. A database designed to handle transactions is not structured to do analytics well. In comparison, a data warehouse is a specialized set of capabilities for extracting data from transactional systems and storing the data in a specific type of database that is organized and optimized to support data analysis and reporting.

In some embodiments, the data warehouse 130 may include multiple databases that store data at different levels of transformation, including source databases, operational data stores, the core data warehouse database and specialized data marts that present filtered views of the data to users. The data warehouse 130 may be implemented as a special relational database as a layer on top of other databases. In detail, the data warehouse 130 may typically include one or more databases, tools for performing extract, transform and load (ETL) from source systems, capabilities for managing data schemas and the data dictionary, with tools for publishing data to data marts and consuming systems. The data warehouse 130 is focused on collecting data from multiple sources to facilitate broad access and analysis, and further optimized to store large volumes of historical data and enables fast and complex querying of that data. The data warehouse 130 specializes in data aggregation and provides a longer view of an organization's data over time. In addition, the data warehouse 130 may serve as a query execution and processing engine for that data, enabling end users to interact with the data that is stored in the database over which the data warehouse 130 is built on. Complex queries are very difficult to run without a temporary pause of database update operations. A frequently paused transactional database will inevitably lead to data errors and gaps. Therefore a data warehouse serves as a separate platform for aggregation across multiple sources and then for analytics tasks across those diverse sources. This separation of roles allows databases to remain focused on transactional jobs without interruption.

The data warehouse 130 may include multiple tiers, e.g., a bottom tier 131, a middle tier 133, a top tier 135, and a data warehouse manager 137. In some embodiments, the data warehouse manager 137 may be implemented as a part of the other tiers, e.g., the bottom tier 131, the middle tier 133, or the top tier 135. The data warehouse 130 may be an offline operational data warehouse, offline data warehouse, on time data warehouse, or an integrated data warehouse. The bottom tier 131 may be a database server used to extract data from multiple sources, e.g., to extract a transaction record 134 from the storage 117. The middle tier 133 may be an online analytical processing (OLAP) server, which transforms data to enable analysis and complex queries. For example, the middle tier 133 may include a transaction record 138, which may be a transformed one from the transaction record 134. For example, the transaction record 138 may have same or similar content with the transaction record 134 but in different format conforming to the format for the middle tier 133. The top tier 135 may be tools used for high-level data analysis, querying, reporting, and data mining, and further provide services to other applications. The data warehouse 130 may accept inputs from various sources, e.g., from the storage 117 of the electronic payment transaction processing network 110, or by user input 132. The illustration of the data warehouse 130 and the electronic payment transaction processing network 110 are for example only, and are not limiting. In some other embodiments, the data warehouse 130 may be viewed as a part of the electronic payment transaction processing network 110.

The multiple entities, e.g., a merchant, a store, and a terminal may form a hierarchical relationship within the data warehouse 130. The merchant may be referred to as a parent node for the stores in the hierarchical relationship, and the parent node includes multiple child nodes, e.g., the stores. Such a hierarchical relationship may be referred to as a financial hierarchy. For example, a merchant identifier 145 may include a store with a store identifier 146, a store with a store identifier 149, and a store with a store identifier 139. The merchant identifier 145, the store identifier 146, the store identifier 149, and the store identifier 139 represent the merchant 111, the store 121, the store 125, and the store 127. A store identifier, e.g., the store identifier 146 may include an address 147 for the store, and a terminal identifier 148 for a transactional terminal within the store. Transaction records stored in the data warehouse 130 may be associated with a specific store of the merchant. For example, one or more transaction records 154 are associated with the store identifier 149. In addition, a store may be located in a city, a region, or a country, where the city, the region, and the country may form a location hierarchy.

A transaction flow graph may be constructed based on the hierarchical structures, e.g., the financial hierarchy or the location hierarchy, which can be used to denote money flow at different levels. For example, when money is withdrawn from an automated teller machine (ATM) device using debit card, the money flows from a primary account (PAN) number to the ATM devices. Each PAN belongs to a bank identification number (BIN), and each BIN belongs to a business identification number (BID). Similarly, each ATM locates in a city, and each city locates in a country. Thus, this flow graph can be constructed as: BID→BIN→PAN→ATM→City→Country, which indicates the money flow direction from end to end.

Among other things, some embodiments herein present a computer-implemented method for security. The method includes providing a transaction flow graph including a first tree representing a financial hierarchy, and a second tree representing a location hierarchy. The transaction flow graph is to be stored in a storage device. At least one node of the first tree or the second tree has multiple children. One or more edges or one or more nodes of the first tree and the second tree has a first attribute and a second attribute. The first attribute is based on historical data, and the second attribute is based on current data associated with the one or more edges or one or more nodes. The method further include receiving data about a financial transaction in an electronic payment processing network, where the financial transaction is related to a first leaf node in the first tree, and a second leaf node in the second tree. The method also includes updating the second attributes of edges or nodes that can reach the first leaf node in the first tree, and the second attributes of edges or nodes that can reach the second leaf node in the second tree. Moreover, the method includes detecting a security attack by detecting an abnormal node or edge in the first tree or the second tree, the abnormal node or edge having a second attribute being out of a predefined range compared to the first attribute of the abnormal node or edge. In addition, the method includes notifying a user of the detection of the abnormal node or edge.

In some embodiments, a first attribute of an edge or a node of the first tree or the second tree includes a number of transactions, a total amount of transactions, or an out flow degree. A node of the first tree represents a primary account (PAN), a bank identification number (BIN), an issuer identification number (IIN), a business identification number (BID), an Interbank Card Association (ICA) Number, or any other financial attribute. A node in the second tree represents an automated teller machine (ATM) location, a store location, a city, a country, or a location attribute. The attributes may be represented by an edge, or a node of the first tree or the second tree. In some embodiments, an edge or a node may have two or more attributes including the first attribute and the second attribute. In some other embodiments, there may be two transaction flow graphs used, e.g., one model real-time transactions while another one model historical data, where edges or nodes of a first transaction flow graph may represent the first attributes, and the edges or nodes of a second transaction flow graph may represent the second attributes.

Figure 2:
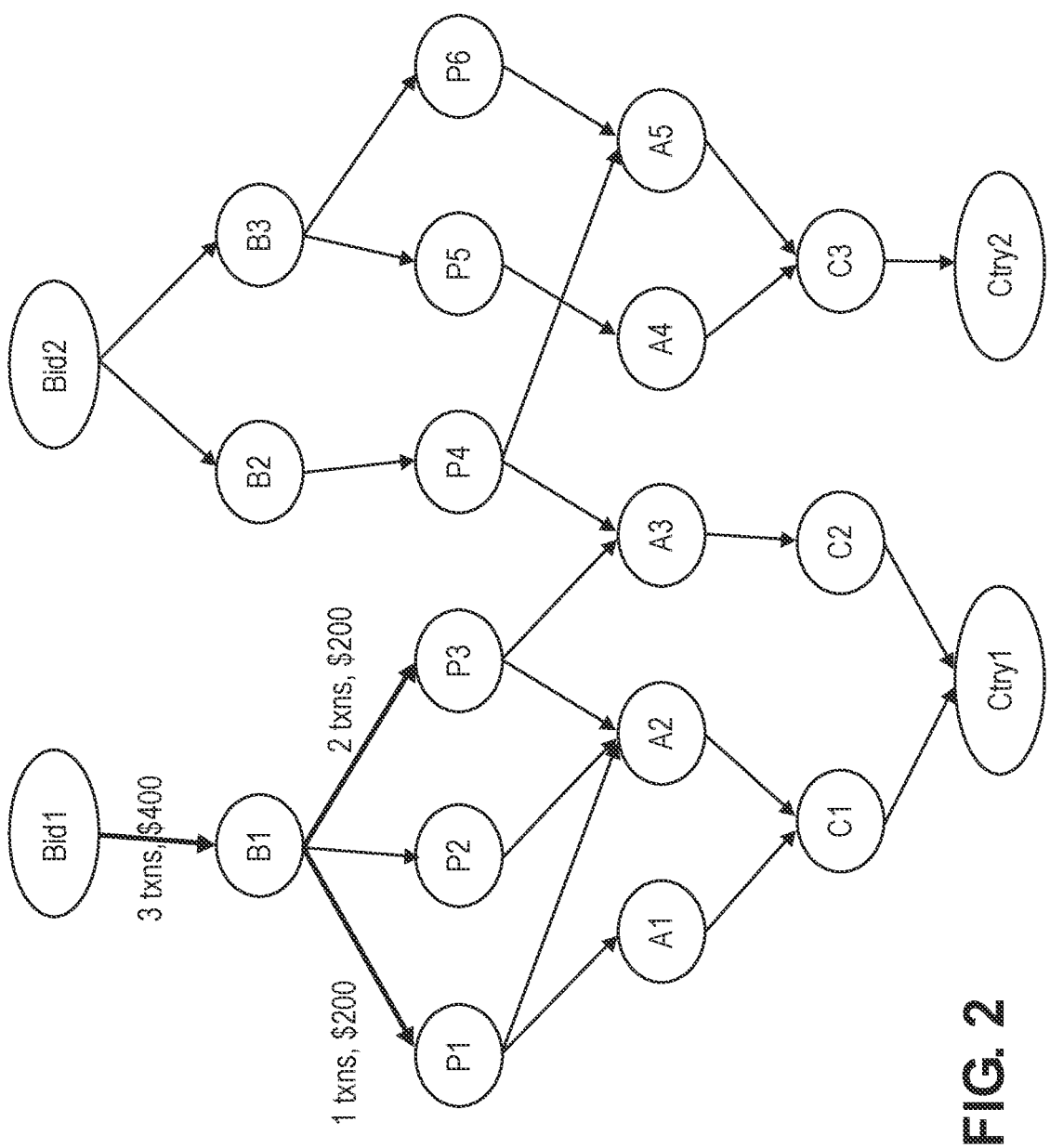
FIG. 2 illustrates an example of a transaction flow graph representing financial transactions in an electronic payment processing network to detect a security attack, in accordance with various embodiments.

FIG. 2 illustrates an example of a hierarchal transaction flow graph representing financial transactions in an electronic payment processing network to detect a security attack, in accordance with various embodiments. In this example, the transaction flow graph (also referred to herein simply as a "flow graph"), congestion nodes (the node with unusually high inflow/outflow volumes) can be identified by comparing the real-time graph with a baseline graph. In some embodiments, two different transaction flow graphs may be built and used to detect security attacks. In some other embodiments, a transaction flow graph may be built with two or more attributes, where a first attribute is based on historical data, and the second attribute is based on current data. There are many other different ways to implement the transaction flow graphs to detect security attacks. The system can identify congestion nodes in real time.

For example, the transaction flow graph shown in FIG. 2 may be a real time transaction flow graph constructed each hour to calculate the flow count, flow amount ($), and out-flow degrees. For example, in the given graph, the 3 values for node B1 are: Flow count=3, Flow amount=$400, and Out-flow degree: 2 (there are 2 edges flowing out from B1 to P1 and P3).

Figure 3A:
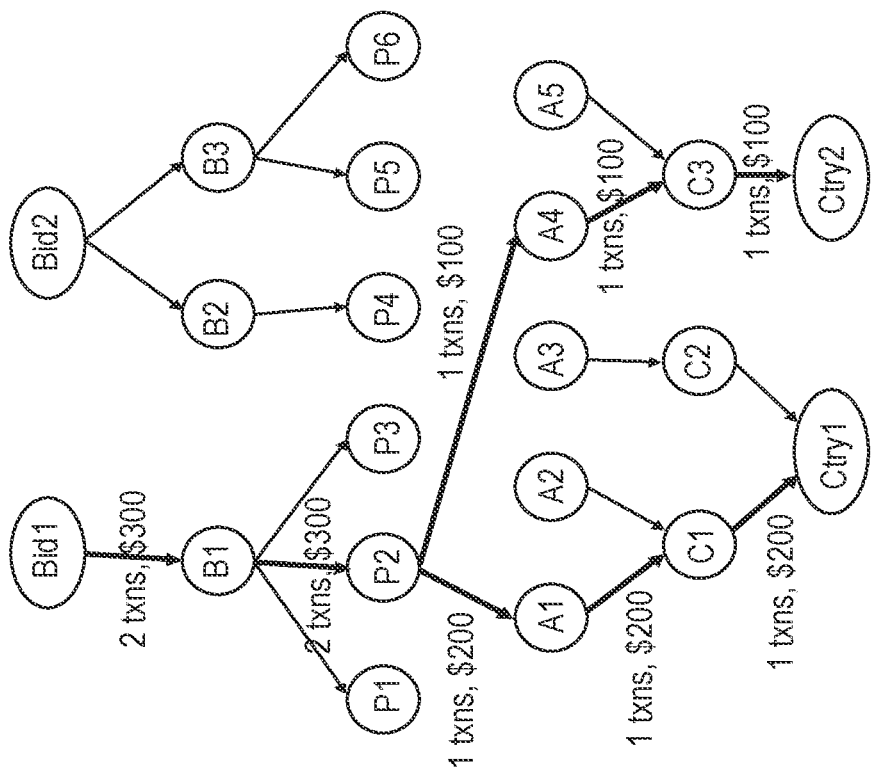
FIGS. 3A-3D illustrate examples of constructing transaction flow graphs representing financial transactions in an electronic payment processing network to detect a security attack, in accordance with various embodiments.
Figure 3B:
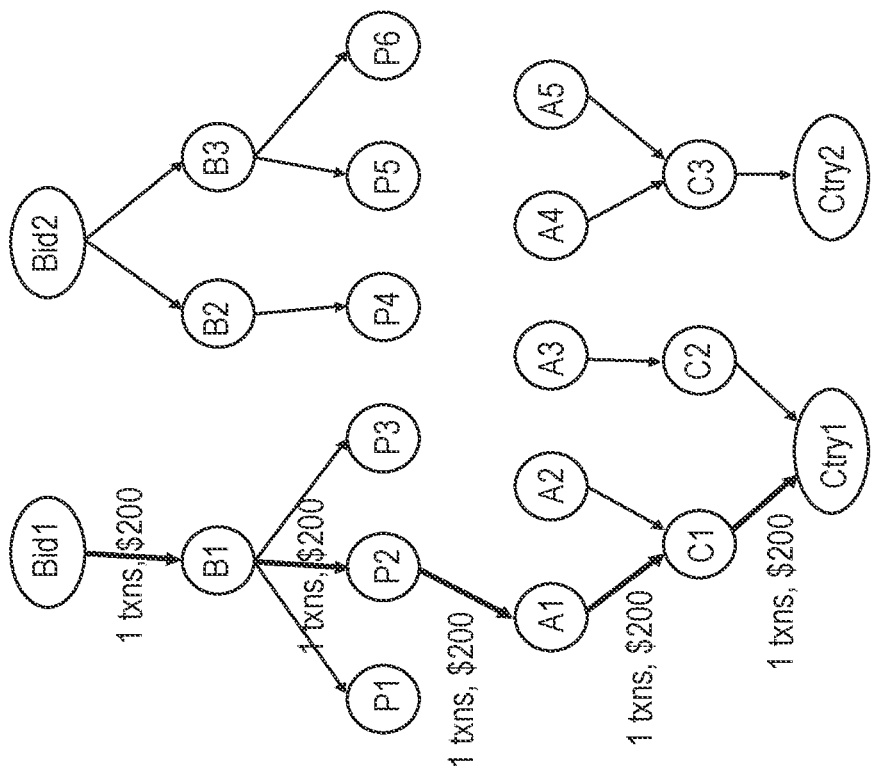
Figures 3C, 3D:
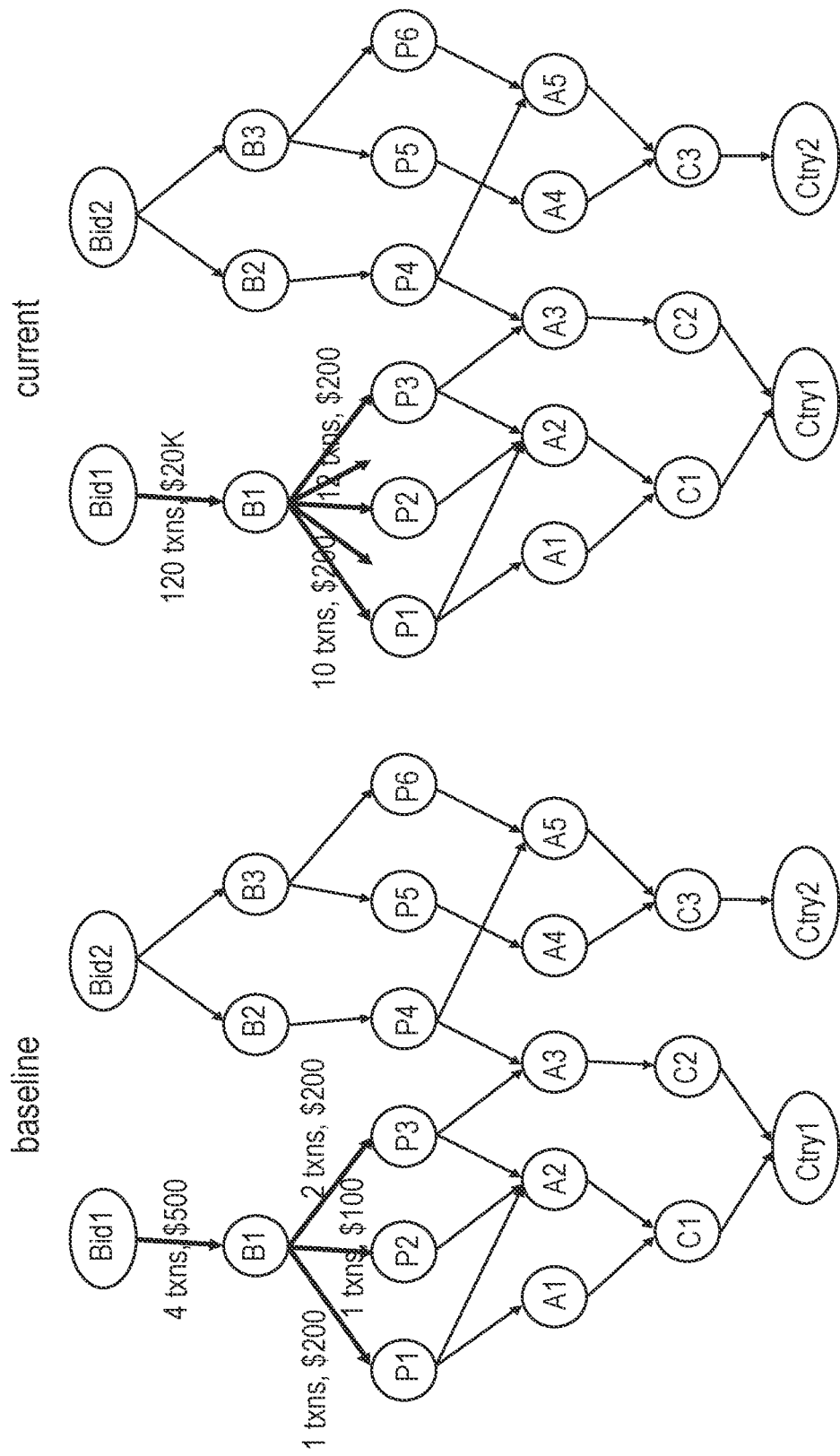

In particular, FIGS. 3A-3D illustrate details of constructing transaction flow graphs representing financial transactions in an electronic payment processing network to detect a security attack, in accordance with various embodiments. FIGS. 3A-3D illustrate a procedure for constructing transaction flow graph representing financial transactions in an electronic payment processing network to detect a security attack. The procedure may include: developing a baseline flow graph with historical data, with nodes representing the entities at different levels, and edges representing the average money flow in a time period (e.g., hourly). When the new transactions come in, the flow amount (edge value) for the current time period may be calculated. The current edges with the baseline edges are compared one by one, and then the edges with abnormal flows are identified. The procedure may further include sending out an alert to stakeholders to automatically block the corresponding nodes. For example, FIG. 3A illustrates the addition of a first transaction, and FIG. 3B illustrates the addition of a second transaction.

In some embodiments, to construct the baseline graph (shown in FIG. 3C), the historical data in the past 90 days may be used. On the other hand, a real time transaction flow graph may be constructed each hour, to calculate the flow count, flow amount ($), and out-flow degrees. Using 90 days historical data, there will be 90*24=2160 records for each value, so that an average value can be obtained as baseline for B1. Similarly, the baseline for all other nodes can be calculated.

TABLE 1

|  | Baseline | Current |
| --- | --- | --- |
| Txn count | 4 | 120 |
| Txn Amount | 500 | 20,000 |
| Out-flow degree | 3 | 60 |

Based on Table 1 shown above, the average ratio between the current (FIG. 3C) and baseline (FIG. 3D) can be calculated as: (120/4+20000/500+60/3)/3=30. Therefore, the metrics in the current hour is 30 times the baseline. Based on this value, a node can be identified as being attacked. In alternate embodiments, other kinds of calculation and metrics may be used to detect the abnormal nodes compared to baseline nodes.

Figure 4B:
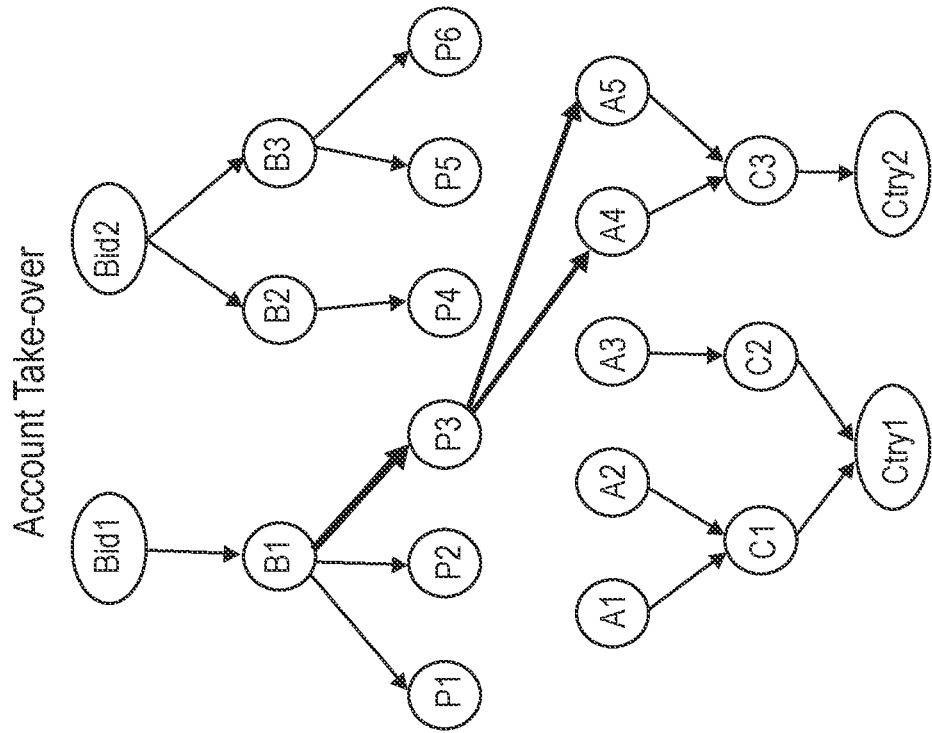
FIGS. 4A-4D illustrate examples of various transaction flow graphs representing financial transactions in an electronic payment processing network to detect various security attacks, in accordance with various embodiments.
Figure 4A:
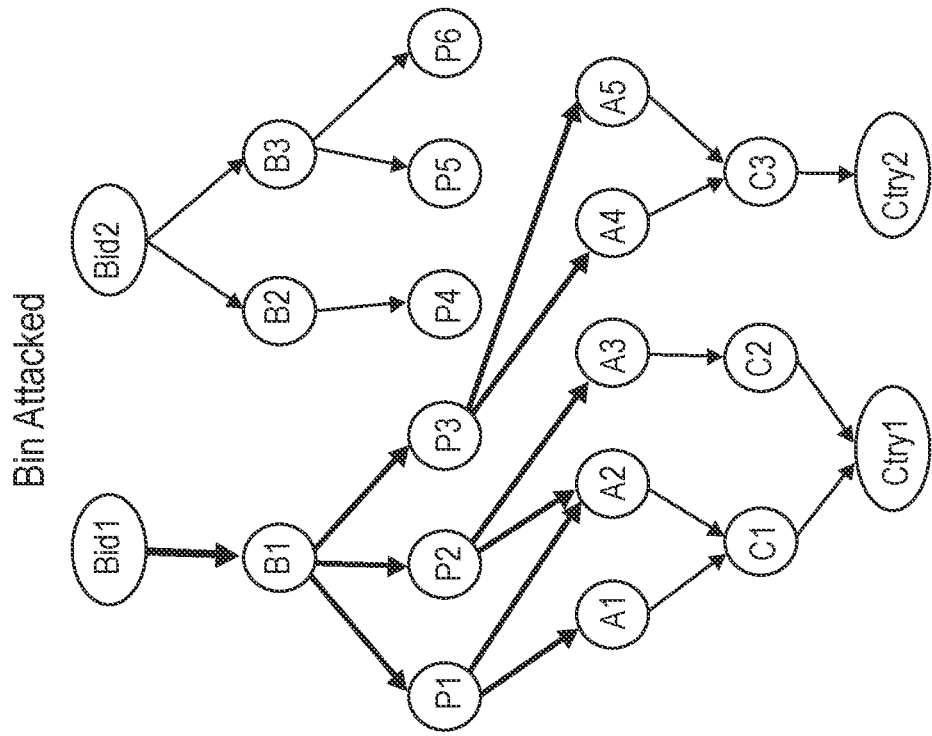
Figure 4D:
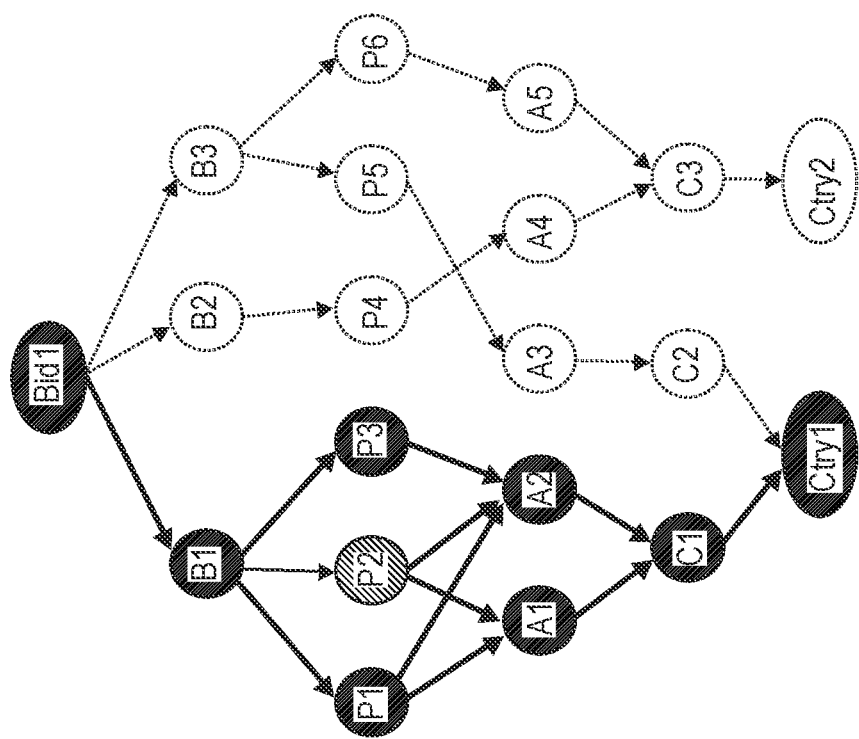
Figure 4C:
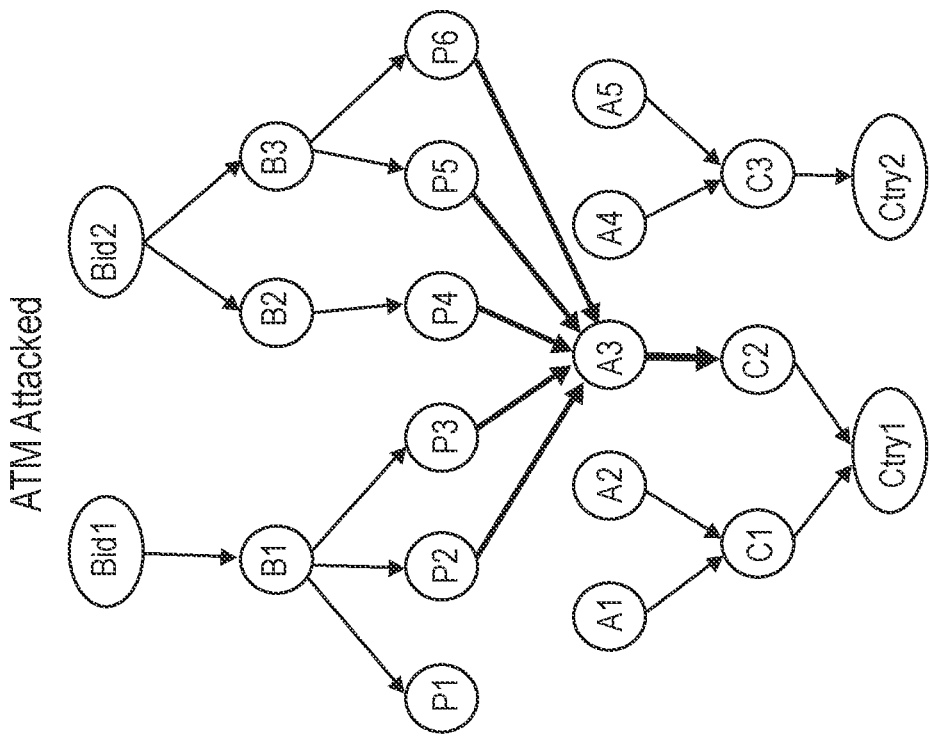

FIGS. 4A-4D illustrate various transaction flow graphs representing financial transactions in an electronic payment processing network to detect various security attacks, in accordance with various embodiments. For example, FIG. 4A illustrates an example where a bank identification number (BIN) is attacked, while FIG. 4B illustrates an example of an attempted account take-over, and FIG. 4C illustrates and example where an automated teller machine (ATM) device is attacked.

There may be different fraud examples in alternate embodiments. Based on the hierarchical graph, by comparing the current graph to baseline graph, the fraud pattern can be identified. Some embodiments may additionally identify multiple different frauds at the same time.

FIG. 4D illustrates an example whereby the system identifies one or more transactions in the flow graph associated with a risk of fraud. The path between the nodes may be identified as being associated with a risk of fraud, in addition to the nodes themselves. The system may then block all transactions related to the fraud risk. In the example shown in FIG. 4D, for example, the system identifies the darkest shaded nodes and paths between them (Bid1, B1, P1, P3, A1, A2, C1, and US) as being associated with a fraud risk. The analysis in this example excludes node P2 (and the path between B1 and P2), as well as nodes B2 and B3 and subsequent nodes/paths on the right side of the graph.

Figure 5:
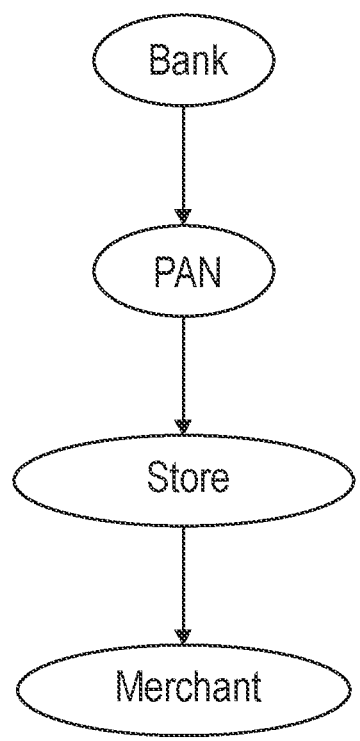
FIG. 5 illustrates an example of a financial hierarchy and location hierarchy used to construct a transaction flow graph, in accordance with various embodiments.

FIG. 5 illustrates an example financial hierarchy and location hierarchy used to construct a transaction flow graph, in accordance with various embodiments. As long as a transaction can be represented as a hierarchical flow, a transaction flow graph can be constructed and used to detect a security attack. For example, embodiments can be applicable to the system to the following problem: As illustrated in FIG. 5, the edges can be connected with the following hierarchy. In this example, for instance, PAN is connected to store (PAN is used in the store). Each PAN belongs to a bank. Each store belongs to a merchant (e.g., a Walmart store belongs to Walmart Corporate). Using the same system based on the transaction flow graph, the bank, PAN, store, or merchant can be identified as being attacked.

Figure 6:
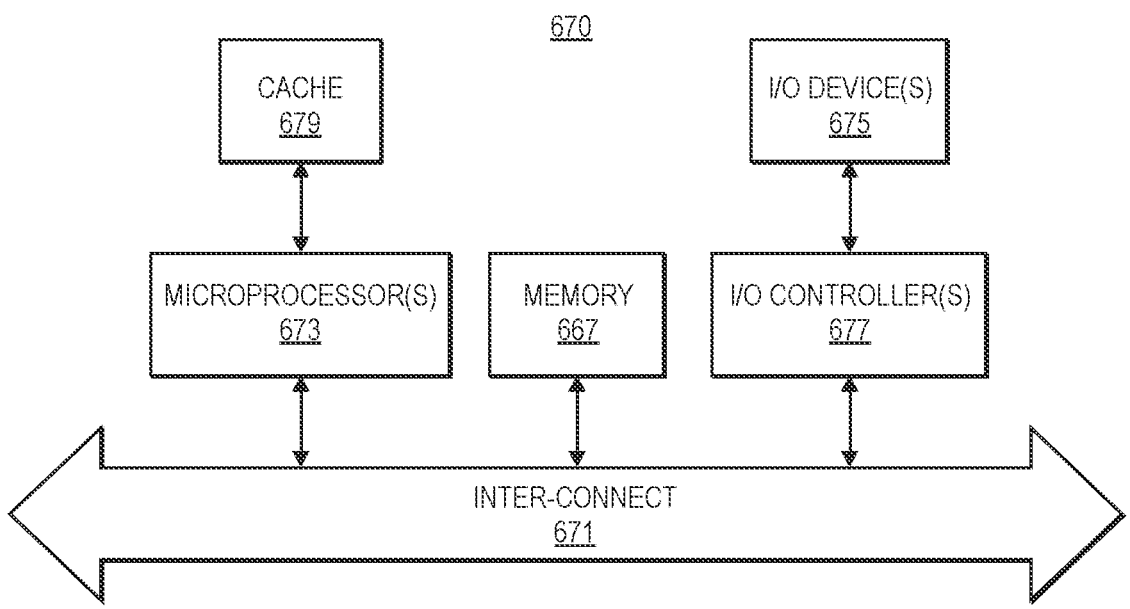
FIG. 6 illustrates an example of a device suitable for use to practice various aspects of the present disclosure, in accordance with various embodiments.

FIG. 6 illustrates an example of a device suitable for use to practice various aspects of the present disclosure, in accordance with various embodiments. While FIG. 6 illustrates various components of a computer system, it is not intended to represent any particular architecture or manner of interconnecting the components. One embodiment may use other systems that have fewer or more components than those shown in FIG. 6.

In FIG. 6, the data processing system 670 includes an inter-connect 671, e.g., bus and system core logic, which interconnects a microprocessor(s) 673, memory 667, and input/output (I/O) device(s) 675 via I/O controller(s) 677. The microprocessor 673 is coupled to cache memory 679. I/O devices 675 may include a display device and/or peripheral devices, such as mice, keyboards, modems, network interfaces, printers, scanners, video cameras and other devices known in the art. In one embodiment, when the data processing system is a server system, some of the I/O devices 675, such as printers, scanners, mice, and/or keyboards, are optional.

In one embodiment, the inter-connect 671 includes one or more buses connected to one another through various bridges, controllers and/or adapters. In one embodiment the I/O controllers 677 include a USB (Universal Serial Bus) adapter for controlling USB peripherals, and/or an IEEE-1394 bus adapter for controlling IEEE-1394 peripherals.

In one embodiment, the memory 667 includes one or more of: ROM (Read Only Memory), volatile RAM (Random Access Memory), and non-volatile memory, such as hard drive, flash memory, etc. Volatile RAM is typically implemented as dynamic RAM (DRAM), which requires power continually in order to refresh or maintain the data in the memory. Non-volatile memory is typically a magnetic hard drive, a magnetic optical drive, an optical drive (e.g., a DVD RAM), or other type of memory system which maintains data even after power is removed from the system. The non-volatile memory may also be a random access memory. The non-volatile memory can be a local device coupled directly to the rest of the components in the data processing system. A non-volatile memory that is remote from the system, such as a network storage device coupled to the data processing system through a network interface such as a modem or Ethernet interface, can also be used.

In this description, some functions and operations are described as being performed by or caused by software code to simplify description. That is, the techniques may be carried out in a computer system or other data processing system in response to its processor, such as a microprocessor, executing sequences of instructions contained in a memory, such as ROM, volatile RAM, non-volatile memory, cache or a remote storage device.

Alternatively, or in combination, the functions and operations as described here can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While one embodiment can be implemented in fully functioning computers and computer systems, various embodiments are capable of being distributed as a computing product in a variety of forms and are capable of being applied regardless of the particular type of machine or computer-readable media used to actually effect the distribution.

In embodiments, a storage medium may store instructions for practicing methods described with references to the figures and description herein, in accordance with various embodiments. For example, a non-transitory computer-readable storage medium may include a number of programming instructions. Programming instructions may be configured to enable a device, e.g., the device 670, in response to execution of the programming instructions, to perform, e.g., various operations associated with detecting security attacks based on transaction flow graphs.

Routines executed to implement the embodiments may be implemented as part of an operating system or a specific application, component, program, object, module or sequence of instructions referred to as "computer programs." The computer programs typically include one or more instructions set at various times in various memory and storage devices in a computer, and that, when read and executed by one or more processors in a computer, cause the computer to perform operations necessary to execute elements involving the various aspects.

The non-transitory computer-readable storage medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a machine readable medium includes any mechanism that provides (i.e., stores and/or transmits) information in a form accessible by a machine (e.g., a computer, network device, personal digital assistant, manufacturing tool, any device with a set of one or more processors, etc.). In various embodiments, hardwired circuitry may be used in combination with software instructions to implement the techniques. Thus, the techniques are neither limited to any specific combination of hardware circuitry and software nor to any particular source for the instructions executed by the data processing system.

Figure 7:
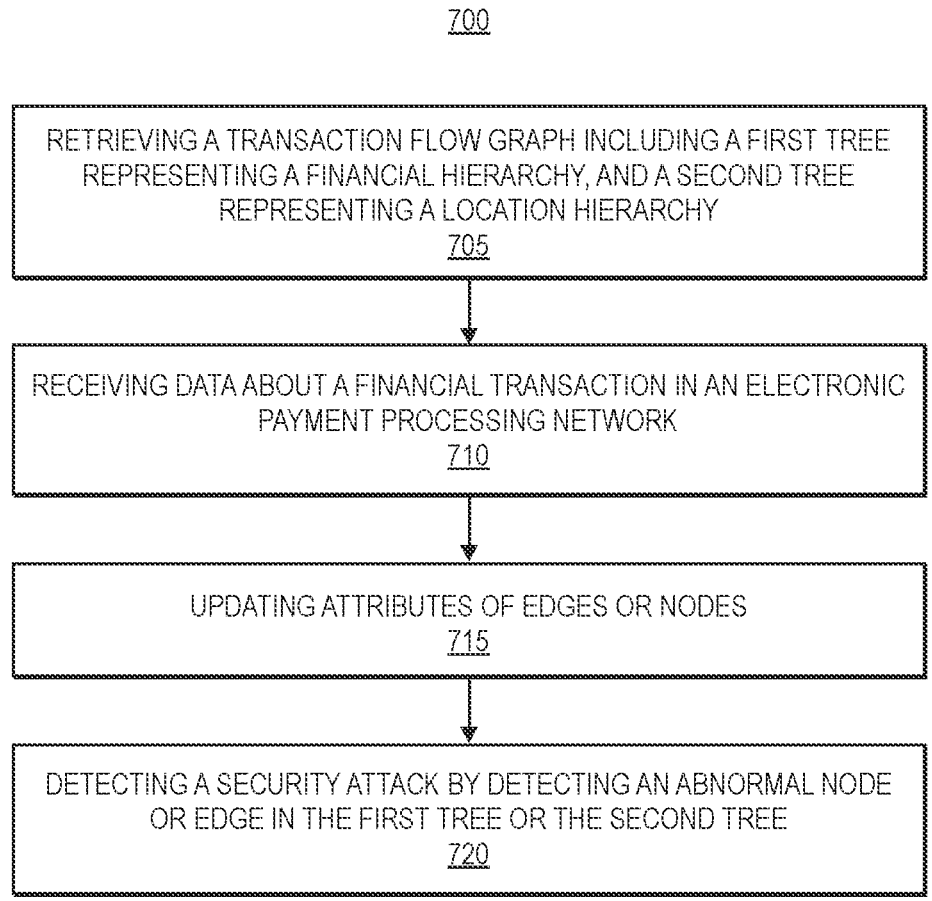
FIG. 7 illustrates an example of a process for detecting a security attack associated with a transaction in an electronic payment processing network in accordance with various embodiments.

FIG. 7 illustrates an example of a process for detecting a security attack associated with a transaction in an electronic payment processing network in accordance with various embodiments. The process shown in FIG. 7 may be performed by one or more computer systems, such as by one or more of the systems illustrated in FIG. 1 or 6. Any combination and/or subset of the elements of the methods depicted herein may be combined with each other, selectively performed or not performed based on various conditions, repeated any desired number of times, and practiced in any suitable order and in conjunction with any suitable system, device, and/or process. The methods described and depicted herein can be implemented in any suitable manner, such as through software operating on one or more computer systems. The software may comprise computer-readable instructions stored in a tangible computer-readable medium (such as the memory of a computer system) and can be executed by one or more processors to perform the methods of various embodiments.

In this example, process 700 includes, at 705, retrieving (e.g., from a memory) a transaction flow graph including a first tree representing a financial hierarch, and a second tree representing a location hierarchy. For example, in some embodiments at least one node of the first tree or the second tree may multiple children, and one or more edges or one or more nodes of the first tree and the second tree may have one or more attributes (e.g., a first attribute and a second attribute). For example, the first attribute may be based on historical data, and the second attribute may be based on current data associated with the one or more edges or one or more nodes. In some embodiments, a first attribute of an edge or a node of the first tree or the second tree includes a number of transactions, a total amount of transactions, or an out flow degree.

In some embodiments, a node of the first tree may represent a primary account (PAN), a bank identification number (BIN), an issuer identification number (IIN), a business identification number (BID), or an Interbank Card Association (ICA) number. Additionally or alternatively, a node in the second tree may represent an automated teller machine (ATM) location, a store location, a city, or a country.

Process 700 in FIG. 7 further includes, at 710, receiving data about a financial transaction in an electronic payment processing network. For example, the financial transaction may be related to a first leaf node in the first tree, and a second leaf node in the second tree. Process 700 in FIG. 7 further includes, at 715, updating attributes of edges or nodes, such as by updating the second attributes of edges or nodes that can reach the first leaf node in the first tree, and the second attributes of edges or nodes that can reach the second leaf node in the second tree.

Process 700 in FIG. 7 further includes, at 720, detecting a security attack by detecting an abnormal node or edge in the first tree or the second tree. For example, the abnormal node or edge may have a second attribute being out of a predefined range compared to the first attribute of the abnormal node or edge. In some embodiments, a user may be notified (e.g., via the one or more I/O devices 675 in FIG. 6, such as a display screen) of the detection of the abnormal node or edge. Users may likewise be notified via an electronic communication generated by a computer system implementing the process 700. In some embodiments, the financial transaction may be blocked in response to detecting the security attack associated with the abnormal node or edge in the first tree or the second tree.

The description and drawings are illustrative and are not to be construed as limiting. The present disclosure is illustrative of disclosed features to enable a person skilled in the art to make and use the techniques. Various features, as described herein, should be used in compliance with all current and future rules, laws and regulations related to privacy, security, permission, consent, authorization, and others. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

What is claimed is:

1. A computer system comprising:
   a processor; and
   memory coupled to the processor and storing instructions that, when executed by the processor, cause the computer system to:
   retrieve, from the memory, a transaction flow graph representing financial transactions in an electronic payment processing network and including a first tree representing a financial hierarchy, and a second tree representing a location hierarchy, wherein at least one node of the first tree or the second tree has multiple children, and one or more edges or one or more nodes of the first tree and the second tree has a first attribute and a second attribute, wherein the first attribute is based on historical data, and the second attribute is based on current data associated with the one or more edges or one or more nodes;

receive data about a financial transaction in the electronic payment processing network, wherein the financial transaction is related to a first leaf node in the first tree, and a second leaf node in the second tree;

update, in real time, the second attributes based on current data of edges or nodes that can reach the first leaf node in the first tree, and the second attributes based on current data of edges or nodes that can reach the second leaf node in the second tree;

detect a security attack associated with the financial transaction by detecting an abnormal node or edge in the first tree or the second tree, the abnormal node or edge having a second attribute being out of a predefined range compared to the first attribute of the abnormal node or edge; and block the financial transaction in response to detecting the security attack associated with the abnormal node or edge in the first tree or the second tree.

2. The computer system of claim 1, wherein the memory further stores instructions that, when executed by the processor, cause the computer system to notify a user of the detection of the abnormal node or edge.

3. The computer system of claim 1, wherein a first attribute of an edge or a node of the first tree or the second tree includes a number of transactions, a total amount of transactions, or an out flow degree.

4. The computer system of claim 1, wherein a node of the first tree represents a primary account (PAN), a bank identification number (BIN), an issuer identification number (IIN), a business identification number (BID), or an Interbank Card Association (ICA) number.

5. The computer system of claim 1, wherein a node of the second tree represents an automated teller machine (ATM) location, a store location, a city, or a country.

6. A tangible, non-transitory computer-readable medium storing instructions that, when executed by a computer system, cause the computer system to:

retrieve, from a memory, a transaction flow graph representing financial transactions in an electronic payment processing network and including a first tree representing a financial hierarchy, and a second tree representing a location hierarchy, wherein at least one node of the first tree or the second tree has multiple children, and one or more edges or one or more nodes of the first tree and the second tree has a first attribute and a second attribute, wherein the first attribute is based on historical data, and the second attribute is based on current data associated with the one or more edges or one or more nodes;

receive data about a financial transaction in the electronic payment processing network, wherein the financial transaction is related to a first leaf node in the first tree, and a second leaf node in the second tree;

update, in real time, the second attributes based on current data of edges or nodes that can reach the first leaf node in the first tree, and the second attributes based on current data of edges or nodes that can reach the second leaf node in the second tree;

detect a security attack associated with the financial transaction by detecting an abnormal node or edge in the first tree or the second tree, the abnormal node or edge having a second attribute being out of a predefined range compared to the first attribute of the abnormal node or edge; and block the financial transaction in response to detecting the security attack associated with the abnormal node or edge in the first tree or the second tree.

7. The tangible, non-transitory computer-readable medium of claim 6, wherein the tangible, non-transitory computer-readable medium further stores instructions that, when executed by the computer system, cause the computer system to: notify a user of the detection of the abnormal node or edge.

8. The tangible, non-transitory computer-readable medium of claim 6, wherein a first attribute of an edge or a node of the first tree or the second tree includes a number of transactions, a total amount of transactions, or an out flow degree.

9. The tangible, non-transitory computer-readable medium of claim 6, wherein a node of the first tree represents a primary account (PAN), a bank identification number (BIN), an issuer identification number (IIN), a business identification number (BID), or an Interbank Card Association (ICA) number.

10. The tangible, non-transitory computer-readable medium of claim 6, wherein a node of the second tree represents an automated teller machine (ATM) location, a store location, a city, or a country.

11. A computer-implemented method comprising:

retrieving, by a computer system from a memory, a transaction flow graph representing financial transactions in an electronic payment processing network and including a first tree representing a financial hierarchy, and a second tree representing a location hierarchy, wherein at least one node of the first tree or the second tree has multiple children, and one or more edges or one or more nodes of the first tree and the second tree has a first attribute and a second attribute, wherein the first attribute is based on historical data, and the second attribute is based on current data associated with the one or more edges or one or more nodes;

receiving, by the computer system, data about a financial transaction in the electronic payment processing network, wherein the financial transaction is related to a first leaf node in the first tree, and a second leaf node in the second tree;

updating, by the computer system in real time, the second attributes based on current data of edges or nodes that can reach the first leaf node in the first tree, and the second attributes based on current data of edges or nodes that can reach the second leaf node in the second tree;

detecting a security attack associated with the financial transaction, by the computer system, by detecting an abnormal node or edge in the first tree or the second tree, the abnormal node or edge having a second attribute being out of a predefined range compared to the first attribute of the abnormal node or edge; and blocking the financial transaction by the computer system in response to detecting the security attack associated with the abnormal node or edge in the first tree or the second tree.

12. The computer-implemented method of claim 11, further comprising: notifying, by the computer system, a user of the detection of the abnormal node or edge.

13. The computer-implemented method of claim 11, wherein a first attribute of an edge or a node of the first tree or the second tree includes a number of transactions, a total amount of transactions, or an out flow degree.

14. The computer-implemented method of claim 11, wherein a node of the first tree represents a primary account (PAN), a bank identification number (BIN), an issuer identification number (IIN), a business identification number (BID), or an Interbank Card Association (ICA) number.

15. The computer-implemented method of claim 11, wherein a node of the second tree represents an automated teller machine (ATM) location, a store location, a city, or a country.

* * * * *